Figure 1:
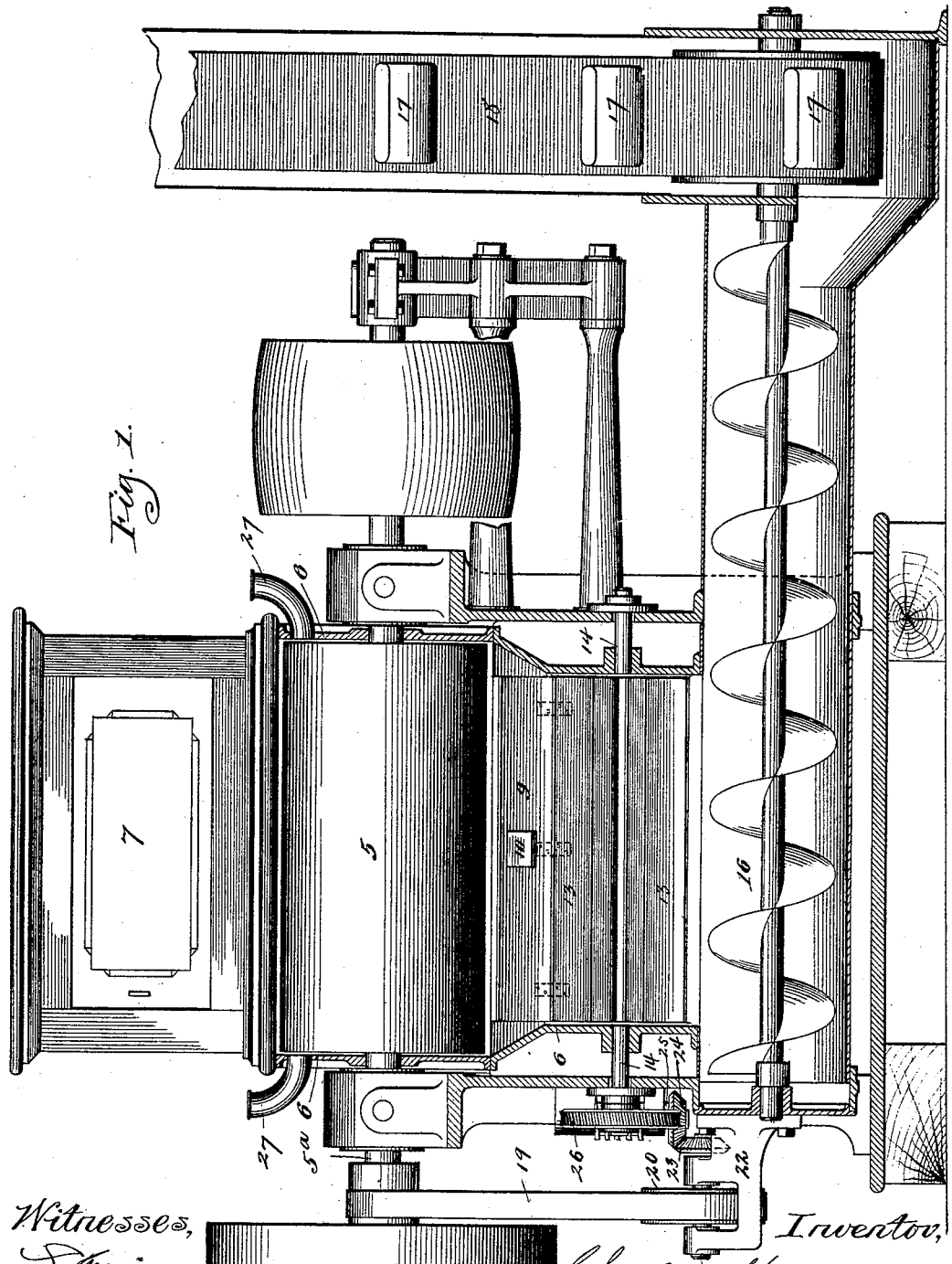

(No Model.) 2 Sheets—Sheet 1.

C. KAESTNER.
MEANS FOR PREVENTING EXPLOSIONS IN MILLS.

No. 479,188. Patented July 19, 1892.

Witnesses,
L. J. Mann.
C. C. Linthicum.

Inventor,
Charles Kaestner
By Offield & Towle, Attys.

(No Model.) 2 Sheets—Sheet 2.
C. KAESTNER.
MEANS FOR PREVENTING EXPLOSIONS IN MILLS.
No. 479,188. Patented July 19, 1892.
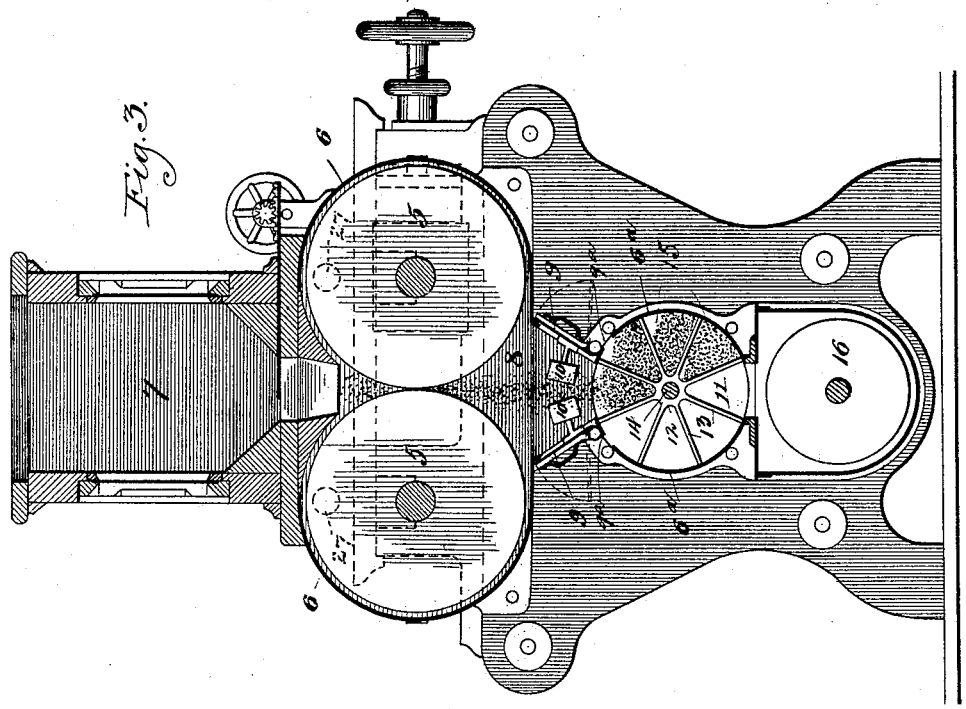
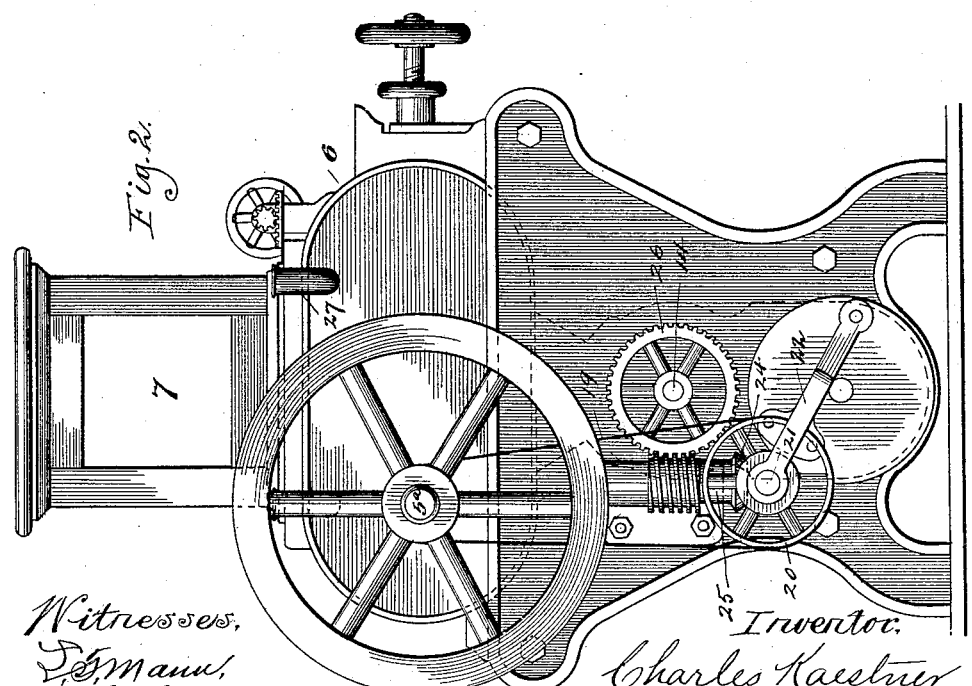
Witnesses,
F. F. Mann,
C. C. Linthicum.
Inventor.
Charles Kaestner
By Offield & Towle Atty's.

UNITED STATES PATENT OFFICE.

CHARLES KAESTNER, OF CHICAGO, ILLINOIS.

MEANS FOR PREVENTING EXPLOSIONS IN MILLS.

SPECIFICATION forming part of Letters Patent No. 479,188, dated July 19, 1892.

Application filed May 13, 1889. Serial No. 310,576. (No model.)

*To all whom it may concern:*

Be it known that I, CHARLES KAESTNER, a citizen of the United States, residing at Chicago, Illinois, have invented certain new and useful Improvements in Means for Preventing Explosions in Mills, of which the following is a specification.

Explosions in mills have been quite frequent heretofore, the chief cause assigned therefor being the passage to the rollers of foreign substances—such as nails, stones, and the like—with the unground grain, and which substances coming in contact with the grinding-rolls revolving at a high rate of speed sparks are generated by the contact, and from these sparks the dust, which is highly explosive, is ignited, thus producing a flame, which as mills have been constructed heretofore had free communication through the discharge-chamber, conveyer-trough, and elevator-spout into the bins, and thus the explosion and conflagration became general, and loss of life and property from this cause has been considerable. It has been attempted to prevent explosions by separating the foreign substances from the grain passing to the grinding-rolls; but hitherto no sufficient means have been discovered for this purpose. I have therefore provided against the communication of sparks from the surface of the rolls to the discharge-passages and the mill, and this I do by interposing a valve between the rolls and the discharge-opening, which valve is adapted to close the passage at all times against the sparks, but is so constructed as to discharge the ground grain in separated quantities; and my invention consists particularly in a means such as above indicated.

In the accompanying drawings, Figure 1 is an elevation, partly in section, of a roller-mill containing the preferred form of construction of my improvements. Fig. 2 is an end elevation thereof. Fig. 3 is a transverse sectional elevation.

In the drawings, 5 5 represent the grinding-rolls, which are journaled to rotate within a suitable casing 6, having a discharge-opening below the opposing faces of the rolls.

7 is the hopper, and 8 a chamber into which the grain is discharged. The walls 9 9 of said chamber are preferably hinged and adapted to swing outwardly, as clearly shown by the dotted lines in Fig. 3. Said walls may be provided with the counterbalancing-weights 10 10, which sustain them in position to inclose the chamber; but should an explosion occur from sparks within said chamber the force thereof will swing the walls outwardly on their hinges, overcoming the resistance of the weight, and the explosion will waste its force in the vicinity of its occurrence and without communicating flame to the bins. Springs may be employed in place of the weights. Said hinged portions also serve to permit the attendant to insert his hand to examine the product. Below the chamber 8 I locate in the outlet-passage 11 a valve of suitable construction and adapted in operation to pass the ground material through it, but adapted at all times to close the passage against sparks.

In the construction shown in Figs. 1 to 3, inclusive, the valve consists of a central hub 12, having blades 13 radiating therefrom and adapted to operate close to the walls of the passage, which at this point are curved on the sides, as clearly shown in the drawings at 6ª. This valve is secured on a rotatable shaft 14, journaled in the end walls of the casing 6, and will be adapted by its rotation to bring the different compartments 15, formed by the radiating blades of the valve, into position to receive the falling grain from the chamber 8 and to discharge the same from the compartments as they are brought successively by the revolution of the valve over the opening to the conveyer or other discharge apparatus.

16 is the screw conveyer, operating, as usual, in a closed box, to deliver the grain to the elevator-boot, from which it is taken up by the buckets 17 on the belt 18 and conveyed to the storage-bins or other receptacles. I prefer to gear the shaft 14 to rotate in unison with the grinding-rolls, and this may be conveniently done by means of a belt 19, which is carried from the pulley on the roller-shaft 5ª over a band-pulley 20 on a short shaft 21, mounted in a bracket 22 and having a beveled gear 23 enmeshed with a similar gear 24 on the end of a worm-shaft 25, the teeth of which turn a worm-gear 26, secured on the end of shaft 14. The gearing will be so proportioned as to rotate the valve at the proper speed to receive and discharge the ground grain without permitting it to accumulate in chamber 8, and preferably so that the compartments shall be filled as successively presented. The walls of the casing within which the valve operates are of such configuration as to closely encircle the said valve, and I prefer to have the interior of said walls or casing finished by grinding or otherwise and the valve-blades so fitted thereto as to render the various compartments between said blades and casing practically air-tight.

The machine may be provided with the pipes 27, which communicate with the roll-chamber, so as to allow a free circulation of air around the rolls to serve as relief-openings in case of explosion, and I prefer to provide relief-openings 9ª in the curved wall-section 6ª, which openings are provided with wire-cloth, so that should an explosion occur which is communicated to the valve-compartments it may vent its force through the relief-openings.

I am aware that rotary valves have been applied to discharge the dust from dust-collectors in separated quantities; also that such valves have been applied to grain cleaning and drying machinery for the discharge of foreign substances, and that reciprocating and rocking valves for feeding the material in separated quantities have been applied in grinding-mills, and therefore I do not claim the form of valve.

I claim—

In means for preventing explosions in mills, the combination, with the grinding mechanism, of a discharge-passage for the ground material, having hinged wall-sections, and a valve located in the discharge-passage below said movable wall-sections and adapted to discharge the grain therethrough in separated quantities, substantially as described.

CHARLES KAESTNER.

Witnesses:
C. C. LINTHICUM,
F. D. BUTLER.